US005631098A

United States Patent [19]
Suzuki

[11] Patent Number: 5,631,098
[45] Date of Patent: May 20, 1997

[54] BATTERY HOLDER

[75] Inventor: Shinichi Suzuki, Kawasaki, Japan

[73] Assignee: Nikon Corporation, Tokyo, Japan

[21] Appl. No.: 497,697

[22] Filed: Jun. 30, 1995

[30] Foreign Application Priority Data

| Sep. 6, 1994 | [JP] | Japan | 6-212441 |
| Sep. 7, 1994 | [JP] | Japan | 6-213405 |
| Sep. 19, 1994 | [JP] | Japan | 6-223520 |

[51] Int. Cl.$^6$ .............. H01M 2/00; H01M 2/10
[52] U.S. Cl. .............. 429/1; 429/96; 429/100
[58] Field of Search ................ 429/1, 96, 100

[56] References Cited

U.S. PATENT DOCUMENTS 5,445,900  8/1995  Miller, Jr. et al. .............. 429/1

Primary Examiner—John S. Maples

[57] ABSTRACT

A battery chamber has a battery storage portion for storing an elongated battery, a battery contact spring member which is disposed at one end of the battery storage portion to contact the electrode of the battery, and first and second press-down members which are disposed at least at one side of the battery storage portion to extend toward the battery side and to press down and hold the outer surface of the battery, and are separated by a predetermined interval, so that the first press-down member is located at the battery contact spring member side. The second press-down member is formed with a slanted portion at an edge on the first press-down member side. A reverse voltage prevention mechanism for a battery according to this invention has a battery contact piece member which is arranged in a battery chamber and is formed with bent portions on the two edges of a plus-end battery contact piece, and an insulating member which is formed with opening portions for receiving the bent portions of the battery contact piece member.

6 Claims, 8 Drawing Sheets

BATTERY HOLDER

BACKGROUND OF THE INVENTION

1. Field of the Invention

The present invention relates to a battery chamber or battery holder for electronic equipment such as a camera and its accessories, and a reverse voltage prevention mechanism therefor.

2. Related Background Art

In general, in various kinds of equipment such as a camera which uses a battery as a power supply, in order to store and hold a battery, a battery chamber is directly arranged in an equipment main body, or a space portion is formed in the equipment main body, and a battery holder is inserted/removed into/from this space portion.

FIG. 6 shows a battery holder which is inserted/removed into/from the space portion formed in the equipment main body when it is used. In this battery holder, side walls 2 and 3 are formed on a holder main body 1 to be separated by a predetermined interval, and a battery storage portion 5 for storing two elongated batteries 4 is formed between these side walls 2 and 3.

A battery contact spring member 6 which contacts the electrodes of the batteries 4 is disposed at the side wall 3 side in the battery storage portion 5.

First and second press-down members 7 and 8 are disposed at the two sides of the battery storage portion 5 to be separated by a predetermined distance. The first and second press-down members 7 and 8 respectively extend toward the battery 4 side, and press and hold the outer surfaces of the batteries 4.

In this battery holder, as shown in FIG. 6, each battery is stored in the battery storage portion 5 in such a manner that the battery contact spring member 6 is pressed down by one end face of the battery 4 in a state wherein the battery contact spring member 6 side of the battery 4 is inclined downward, and thereafter, the battery 4 is set in a horizontal state parallel to the bottom surface of the battery storage portion 5.

However, in this conventional battery holder, when the battery 4 is set in the horizontal state, the battery 4 contacts the second press-down member 8 extending toward the battery 4 side, and the second press-down member 8 is plastically deformed inwardly. Then, it becomes difficult to store the battery 4.

A conventional battery storage device for a camera and accessories normally uses a leaf spring as its battery contact piece, and a bent portion is formed to assure a given spring force amount and stroke.

A user inserts a battery into the battery storage device while confirming the plus and minus directions of the battery according to the display contents indicated in a battery chamber. In this case, the way of insertion via an opening portion varies depending on user's favors.

In the above-mentioned prior art, upon insertion of a battery into the battery chamber, if insertion of the battery to the battery contact piece, which is elastically deformable, is performed later, the battery contact piece is pushed by the battery, and may be permanently deformed.

Some conventional battery storage portions for a camera and accessories have a reverse voltage (i.e., application of a voltage with the inverse polarity) prevention mechanism for preventing a circuit from being destroyed even when a battery is inserted with inverse polarity. For example, the following mechanism is known. As shown in FIG. 12, projections 230 are formed at the two edges of a battery contact piece at the plus end so as to allow easy assembling, and a U-shaped insulating member having openings is mounted on the contact piece, so that the projections of the battery piece are fitted in the openings. When a battery is inserted with correct polarity, the height of plus-end projection of the battery is larger than the thickness of the insulating member, and the outer diameter of this projection is smaller than the inner width of the U-shaped portion of the insulating member. With this mechanism, when a battery is inserted with correct polarity, the plus-end projection of the battery is electrically connected to the battery contact piece; when the battery is inserted with inverse polarity, the minus end of the battery is blocked by the insulating member and cannot be electrically connected to the battery contact piece.

In the above-mentioned prior art, when a battery is inserted from the above, a force acts in a direction to widen the insulating member, and the insulating member is widened beyond the width of the projections of the battery contact piece. As a result, the insulating member may disengage from the battery contact piece.

SUMMARY OF THE INVENTION

The present invention provides, in its first aspect, a battery chamber which can reliably prevent press-down members from being plastically deforming inwardly, and a camera having the battery chamber.

According to the first aspect to the present invention, a battery chamber comprises a battery storage portion for storing an elongated battery, a battery contact spring member which is disposed at one end of the battery storage portion to contact the electrode of the battery, and first and second press-down members which are disposed at least at one side of the battery storage portion to extend toward the battery side and to press down and hold the outer surface of the battery. The press-down members are disposed to be separated by a predetermined interval, so that the first press-down member is located at the battery contact spring member side. The second press-down member is formed with a slanted portion at an edge on the first press-down member side.

In this battery chamber, the battery is stored in the battery storage portion in such a manner that the battery contact spring member is pressed down by one end face of the battery in a state wherein the battery contact spring member side of the battery is inclined downward, and thereafter, the battery is set in a horizontal state parallel to the bottom surface of the battery storage portion. Since the slanted portion, which is slanted toward the first press-down member, is formed on the edge, on the first press-down member side, of the second press-down member, when the battery is set in the horizontal state, the battery slides along the surface of the slanted portion, and the second press-down member is elastically deformed outwardly.

In this battery chamber, a slanted portion may also be formed on an edge, on the second press-down member side, of the first press-down member.

In this case, the battery is stored in the battery storage portion in such a manner that the other end face of the battery is stored in the battery storage portion on the side opposite to the battery contact spring member in a state wherein the side, opposite to the battery contact spring member, of the battery is inclined downward, and thereafter, the battery is set in a horizontal state so that one end face of the battery presses down the battery contact spring member.

Since the slanted portion, which is slanted toward the second press-down member, is formed on the edge, on the second press-down member side, of the first press-down member, when the battery is set in the horizontal state, the battery slides along the surface of the slanted portion, and the first press-down member is elastically deformed outwardly.

In the above-mentioned battery chamber, the first and second press-down members may extend arc like. With this structure, the press-down members reliably contact the outer surface of a columnar battery, and the battery can be reliably held by the press-down members.

The first and second press-down members are preferably formed integrally with the battery storage portion using a resin having an elasticity so as to realize easy manufacture.

A camera having the battery chamber according to the present invention comprises a battery storage portion for storing an elongated battery, a battery contact spring member which is disposed at one end of the battery storage portion to contact the electrode of the battery, and first and second press-down members which are disposed at least at one side of the battery storage portion to extend toward the battery side and to press down and hold the outer surface of the battery. The first and second press-down members are disposed to be separated by a predetermined interval, so that the first press-down member is located at the battery contact spring member side. The second press-down member is formed with a slanted portion at an edge on the first press-down member side.

In this camera, the battery chamber is directly formed in a camera main body. The battery is stored in the battery storage portion in such a manner that the battery contact spring member is pressed down by one end face of the battery in a state wherein the battery contact spring member side of the battery is inclined downward, and thereafter, the battery is set in a horizontal state parallel to the bottom surface of the battery storage portion. Since the slanted portion which is slanted toward the first press-down member is formed on the edge, on the first press-down member side, of the second press-down member, when the battery is set in the horizontal state, the battery slides along the surface of the slanted portion, and the second press-down member is elastically deformed outwardly.

The present invention provides, in its second aspect, a battery storage device which can prevent a battery contact piece from being deformed independently of the way of insertion of a battery by a user.

A battery storage device according to the second aspect of the present invention comprises a battery storage portion which is formed with an opening portion through which a battery is to be inserted, and holds the battery, a battery contact member which has an elasticity, is disposed on a side end portion in the battery storage portion, and contacts the electrode of the battery in a state wherein the battery is held by the storage portion, and a protection member which is disposed at the opening portion side in the vicinity of the battery contact member, and prevents the battery contact member from being deformed upon insertion of the battery.

More specifically, a device of the invention comprises a battery storage portion which is formed with an opening portion through which a battery is to be inserted, and holds the battery, a lid member which is integrally fixed to the battery storage portion, a battery contact member which has an elasticity, is disposed on the battery storage portion side of the lid member, and contacts the electrode of the battery in a state wherein the battery is held by the storage portion, and a protection member which is disposed on the lid member in the vicinity of the battery contact member and the opening portion, and prevents the battery contact member from being deformed upon insertion of the battery.

Furthermore, it is preferable that the protection member be formed in the vicinity of the battery contact member and the opening portion on the lid member.

It is preferable that the protection member formed on the lid member be an eave portion extending from the lid member to the vicinity of the battery contact member.

According to the present invention, since the device comprises the battery storage portion which is formed with the opening portion through which a battery is to be inserted, and holds the battery, the battery contact member which has an elasticity, is disposed on the side end portion in the battery storage portion, and contacts the electrode of the battery in a state wherein the battery is held by the storage portion, and the protection member which is disposed at the opening portion side in the vicinity of the battery contact member, and prevents the battery contact member from being deformed upon insertion of the battery, a user cannot insert a battery unless he or she brings the electrode of the battery into contact with the battery contact member with the elasticity. Therefore, since no extra force acts on the electrode, the electrode can be prevented from being deformed.

The present invention provides, in its third aspect, a reverse voltage prevention mechanism which can prevent an insulating member from disengaging from a battery contact piece independently of the way of insertion of a battery by a user.

A reverse voltage prevention mechanism according to the third aspect of the present invention comprises a battery contact piece member which is disposed in a battery holder, contacts a plus-end electrode of a battery, and is formed with bent portions on its two sides, and an insulating member formed with opening portions in which the bent portions of the battery contact piece member are inserted. The bent portions of the battery contact member contact the edges of the opening portions after they are inserted in the opening portions. Furthermore, the bent portions of the battery contact piece member have an elasticity, and their bending amount is larger than the opening width of each opening portion.

In this mechanism, the bent portions are provided to projections on the two edges of the battery contact piece member. For this reason, even when a force acts in a direction to widen the insulating member, since the edges of the bent portions of the battery contact piece member contact the edges of the opening portions of the insulating member, the insulating member can be held without disengaging from the battery contact piece member.

DETAILED DESCRIPTION OF THE PREFERRED EMBODIMENTS

The preferred embodiments of the present invention will be explained hereinafter with reference to the accompanying drawings.

Figure 1:
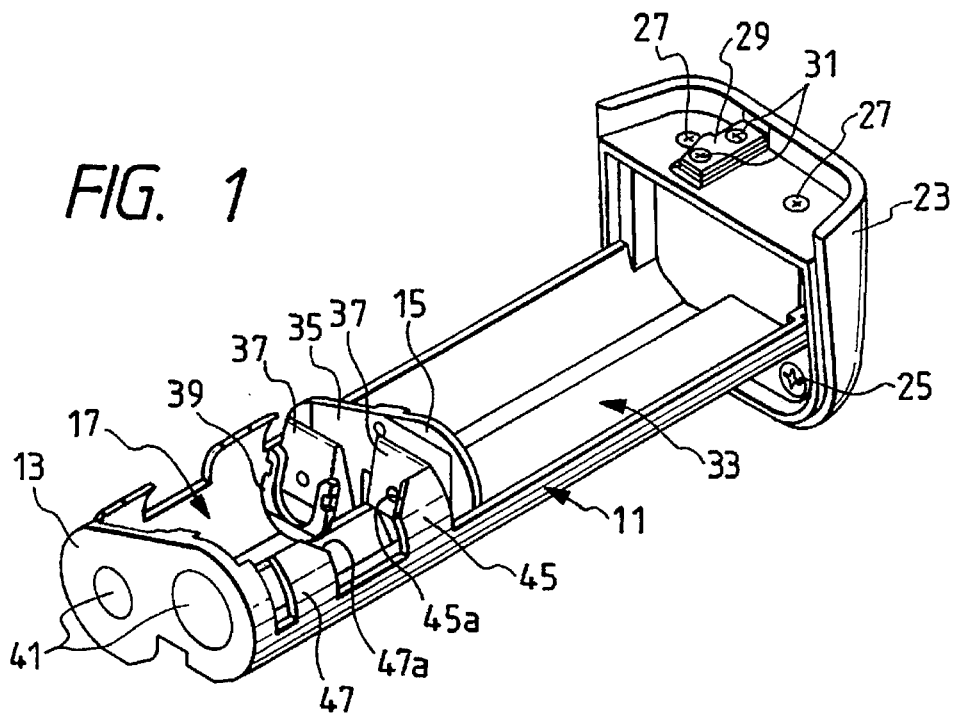
FIG. 1 is a perspective view showing a battery holder having a battery chamber according to the first embodiment of the present invention.
Figure 2:
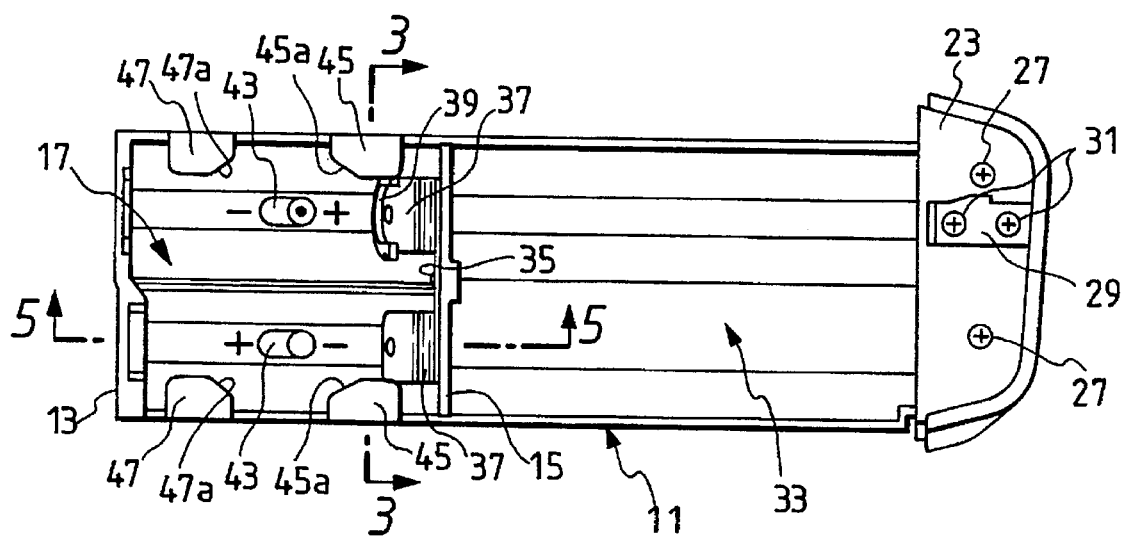
FIG. 2 is a top view of the battery holder shown in FIG. 1.
Figure 3:
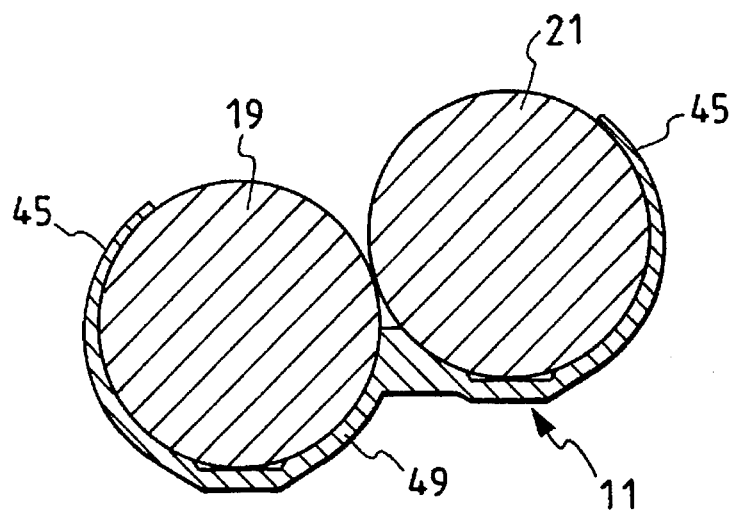
FIG. 3 is a sectional view taken along a line 3—3 in FIG. 2.
Figure 17:
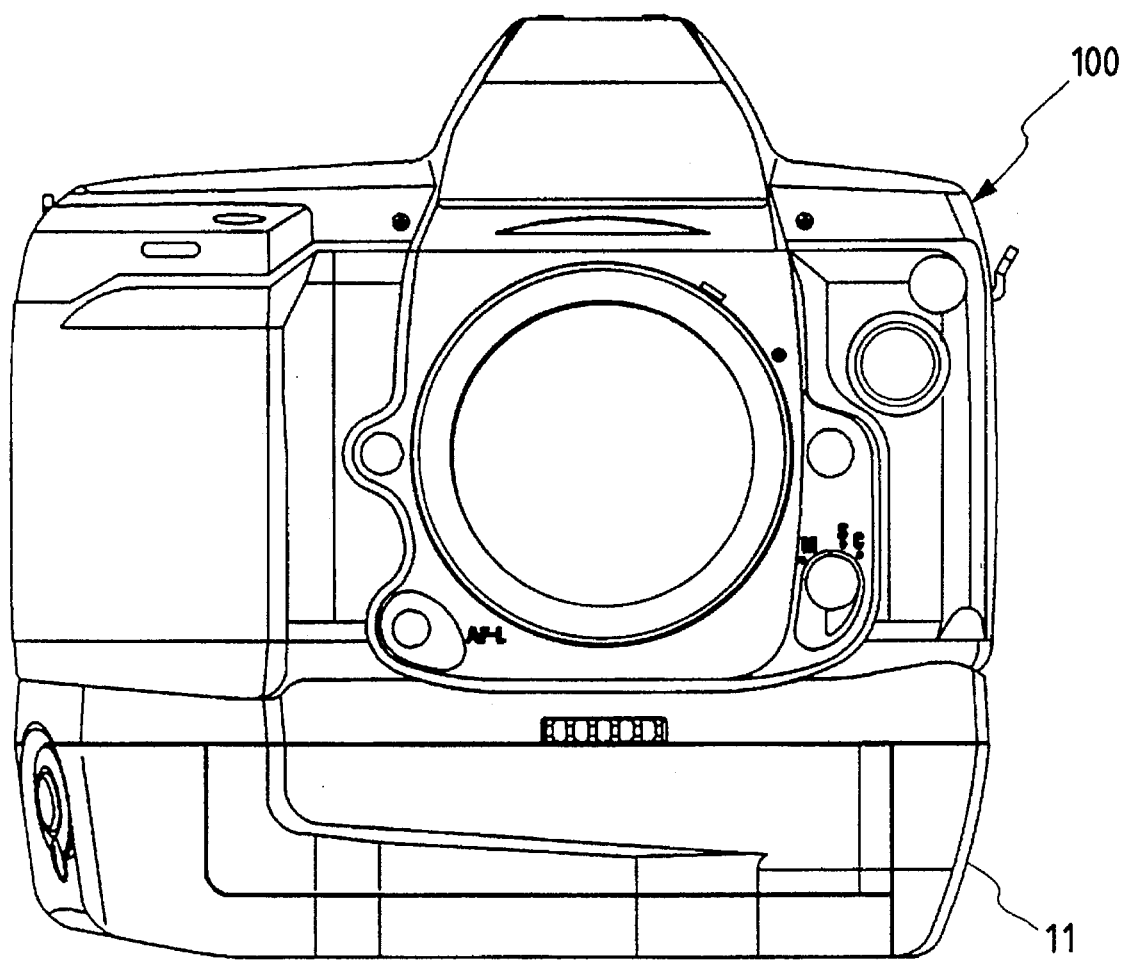
FIG. 17 is a front view showing a camera to which the battery holder shown in FIGS. 1 to 3 is attached.

FIGS. 1 to 3 show a battery holder, which comprises a battery chamber according to an embodiment of the present invention. This battery holder is loaded into a battery holder chamber of an accessory which supplies a power supply voltage to a camera main body when it is used. FIG. 17 shows a state wherein a battery holder 11 is attached to a camera 100.

Side walls 13 and 15 are formed on one side of the holder main body 11 to be separated by a predetermined interval, and a battery storage portion 17 is formed between these side walls.

The battery storage portion 17 parallelly stores, for example, two CR123A lithium batteries 19 and 21, each of which has a larger outer diameter and a smaller length than those of an AA-type battery.

A battery lid 23 is fixed to the other side of the holder main body 11 by screws 25 and 27. A lock pawl 29, which is locked by the camera main body side (not shown), is fixed to the battery lid 23 by screws 31.

In this embodiment, a battery storage space 33 capable of storing four AA-type batteries is formed between the battery lid 23 and the side wall 15.

A contact member 35 is disposed at the side wall 15 side of the battery storage portion 17 formed between the side walls 13 and 15, and battery contact spring members 37 are integrally formed on the contact member 35 so as to be separated by a predetermined interval.

An insulating member 39 consisting of a U-shaped resin is disposed at the inner side of one battery contact spring member 37 so as to prevent electrical connection when the plus and minus ends of the battery 19 are inserted in the wrong direction.

Circular opening portions 41 in which contact pieces of the battery holder chamber of the camera side (not shown) are inserted are formed on the side wall 13.

Marks 43 indicating the polarity directions of the batteries 19 and 21 to be stored are printed on the bottom surface of the battery storage portion 17.

First and second press-down members 45 and 47 are disposed at the two sides of the battery storage portion 17 of the holder main body 11. These press-down members 45 and 47 are disposed to be separated by a predetermined interval, so that the first press-down members 45 are located at the battery contact spring member 37 side.

The first and second press-down members 45 and 47 extend arc like above the battery storage portion 17, so that their edges project toward the batteries 19 and 21.

A slanted portion 47a, which is slanted toward the first press-down member 45, is formed on the edge, on the first press-down member 45 side, of each second press-down member 47.

Also, a slanted portion 45a, which is slanted toward the second press-down member 47, is formed on the edge, on the second-press member 47 side, of each first press-down member 45.

In this embodiment, each of these first and second press-down members 45 and 47 is formed of a resin consisting of, e.g., polypropylene and having an elasticity, and is integrally formed on the holder main body 11, consisting of the same material, together with the side walls 13 and 15.

As shown in FIG. 3, a step portion 49 is formed on the holder main body 11 in the vertical direction, so that one battery 21 is located at a higher level position than the other battery 19.

Figure 4:
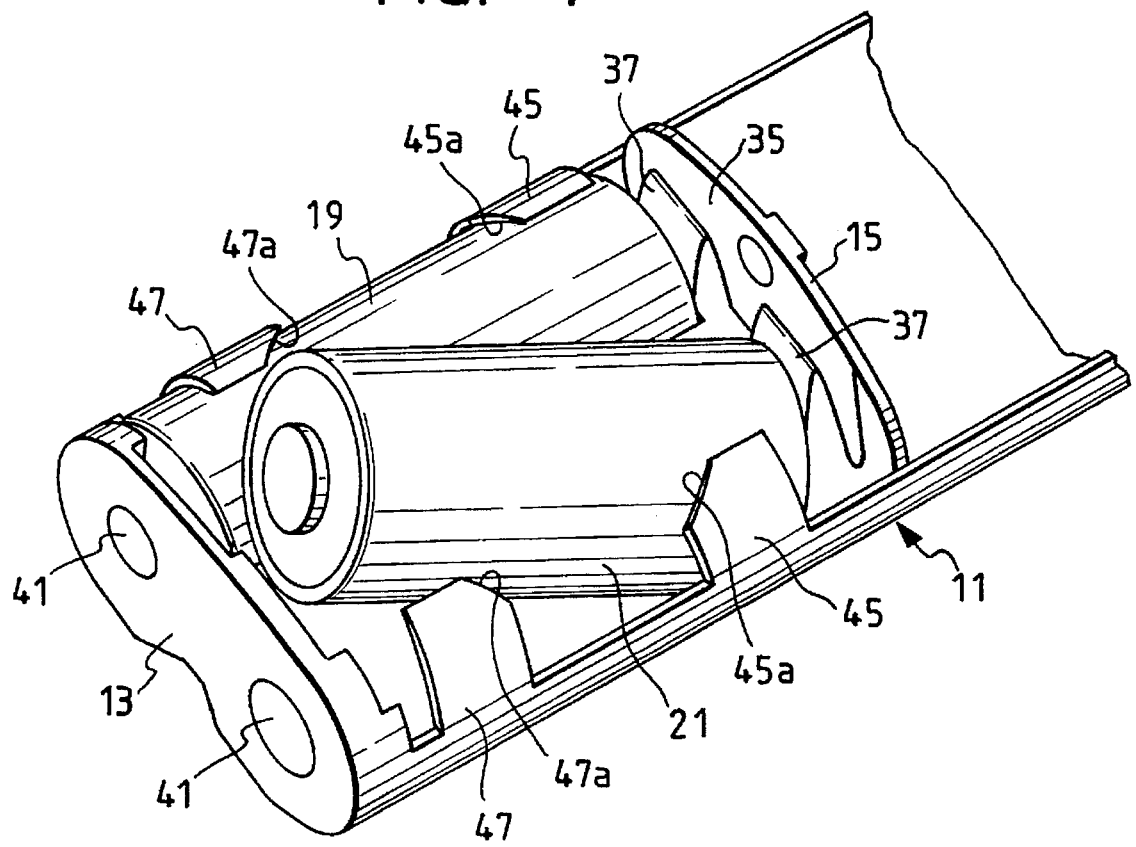
FIG. 4 is a perspective view showing the method of inserting a battery into the battery holder shown in FIG. 1.
Figure 5:
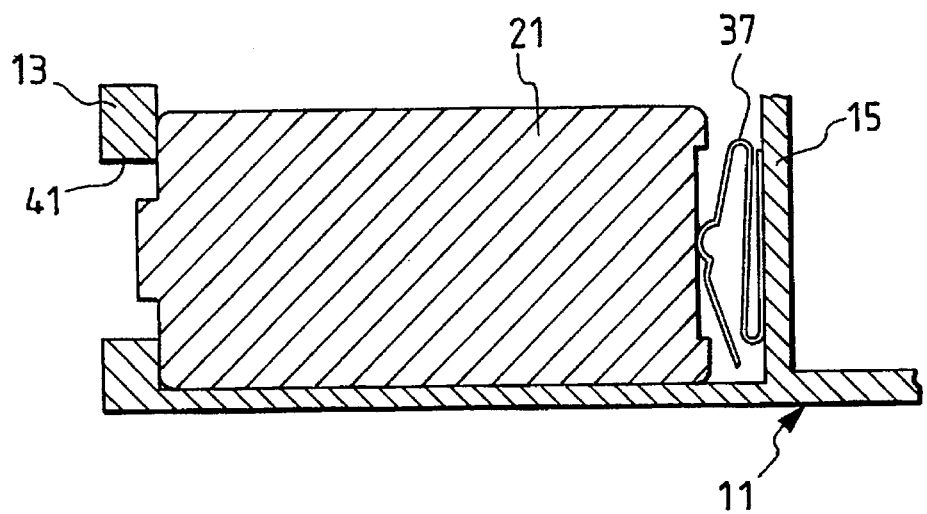
FIG. 5 is a sectional view taken along a line 5—5 in FIG. 2.
Figure 6:
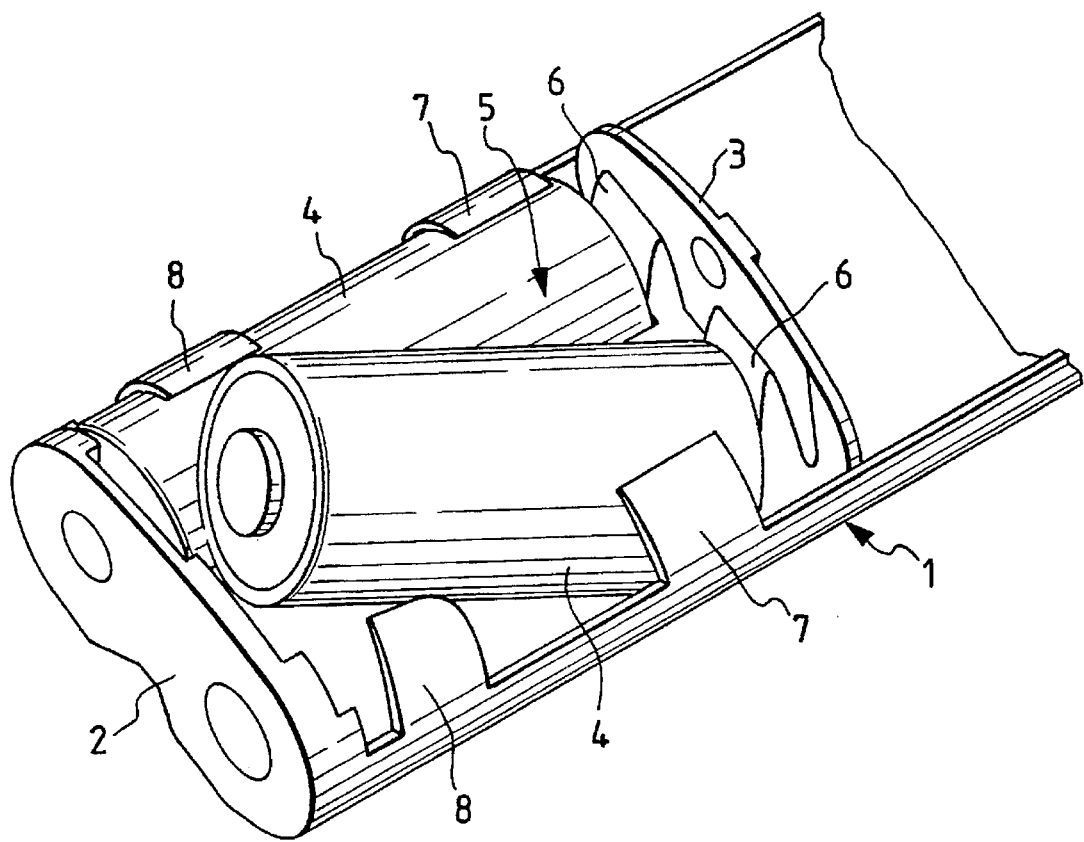
FIG. 6 is a perspective view showing the method of inserting a battery into a conventional battery holder.

In the above-mentioned battery holder, the batteries 19 and 21 are stored in the battery storage portion 17 as follows. As shown in FIG. 4, the other battery 19 is stored in the battery storage portion 17 in the lateral direction first, and thereafter, the battery 21 is stored in the battery storage portion 17, in such a manner that one end face of the battery 21 presses down the battery contact spring member 37 in a state wherein the battery contact spring member 37 side of the battery 21 is inclined downward, and thereafter, the battery 21 is set in a horizontal state parallel to the bottom surface of the battery storage portion 17, as shown in FIG. 5.

In a state wherein neither of the batteries 19 and 21 are stored, the first and second press-down members 45 and 47 are located inside the storage positions of the batteries 19 and 21 toward the battery storage portion 17. When the batteries 19 and 21 are stored, the first and second press-down members 45 and 47 are elastically deformed outwardly, and the batteries 19 and 21 are reliably held by this elastic force.

Although it is not so preferable, in this embodiment, the battery 21 can also be stored in the battery storage portion 17 in such a manner that the side wall 13 side of the battery 21 is stored in the battery storage portion 17 in a state wherein the side, opposite to the battery contact spring member 37 side, of the battery 21 is inclined downward, and thereafter, the battery 21 is set in a horizontal state so that one end face of the battery 21 presses down the battery contact spring member 37.

In the above-mentioned battery holder, the slanted portions 47a, which are slanted toward the first press-down member 45 side, are formed on the edges, on the first press-down member 45 side, of the second press-down members 47. For this reason, when the battery 21 is set in the horizontal state, the battery 21 slides along the corresponding slanted portion 47a, and the corresponding second press-down member 47 is elastically deformed outwardly. Therefore, the second press-down member 47 can be reliably prevented from being plastically deformed inwardly, and the battery 21 can be quickly and reliably stored.

Also, in the above-mentioned battery holder, the slanted portions 45a, which are slanted toward the second press-down member 47 side, are formed on the edges, on the second press-down member 47 side, of the first press-down members 45. For this reason, after one end of the battery 21 is stored in the side, opposite to the battery contact spring member 37, of the battery storage portion 17, the battery 21 can be inserted by setting the battery 21 in the horizontal state.

More specifically, in this case, when the battery 21 is set in the horizontal state, the battery 21 slides along the corresponding slanted portion 45a, and the corresponding first press-down member 45 is elastically deformed outwardly. Therefore, the first press-down member 45 can be reliably prevented from being plastically deformed inwardly.

Furthermore, in the above-mentioned embodiment, since the first and second press-down members 45 and 47 are formed arc like, the press-down members 45 and 47 can reliably contact the outer surfaces of the columnar batteries 19 and 21, and the batteries 19 and 21 can be reliably held by the press-down members 45 and 47.

Since the press-down members 45 and 47 are formed of a resin integrally formed with the holder main body 11 and having an elasticity, the holder main body 11 and the press-down members 45 and 47 can be easily manufactured.

In the above-mentioned battery holder, since the step portion 49 is formed on the holder main body 11, one battery 21 is located at a higher level position than the other battery 19. As a result, the width of the holder main body 11 can be shortened, and the battery 21 can be easily detached.

In the above-mentioned embodiment, the present invention is applied to the battery holder, which is loaded into a battery holder chamber of an accessory for supplying a power supply voltage to a camera main body when it is used. However, the present invention is not limited to this particular embodiment. For example, the present invention can be applied to a battery chamber which is directly formed in the camera main body to hold batteries.

The present invention is not limited to the camera. For example, the present invention can be widely applied to electronic equipment such as a video camera, and various other home electric appliances.

In the above-mentioned embodiments, the first and second press-down members 45 and 47 are disposed on the two sides of the battery storage portion 17. However, the present invention is not limited to this particular embodiment. For example, the first and second press-down members may be disposed at only the battery 21 side.

In the above-mentioned embodiment, the battery storage portion 17 for storing the two batteries 19 and 21 is formed. However, the present invention is not limited to this particular embodiment. For example, the present invention can be applied to a battery storage portion for storing only one battery or battery storage portion for storing three or more batteries.

In the above-mentioned battery chamber, the slanted portion, which is slanted toward the first press-down member, is formed on the edge, on the first press-down member side, of the second press-down member. For this reason, when the battery is set in the horizontal state, the battery slides along the slanted portion, and the second press-down member is elastically deformed outwardly. Therefore, the second press-down member can be reliably prevented from being plastically deformed inwardly.

Also, the slanted portion, which is slanted toward the second press-down member side, is formed on the edge, on the second press-down member side, of the first press-down member. For this reason, when the battery is set in the horizontal state after one end of the battery is temporarily stored at the side, opposite to the battery contact spring member, of the battery storage portion, the battery slides along the slanted portion, and the first press-down member is elastically deformed outwardly. Therefore, the first press-down member can be reliably prevented from being plastically deformed inwardly.

Since the first and second press-down members are formed arc like, the press-down members can reliably contact the outer surfaces of the columnar batteries, and the batteries can be reliably held by the press-down members.

Furthermore, since the press-down members are formed of a resin integrally formed with the battery chamber and having an elasticity, the battery chamber and the press-down members can be easily manufactured.

The second embodiment of the present invention will be described below.

Figure 7:
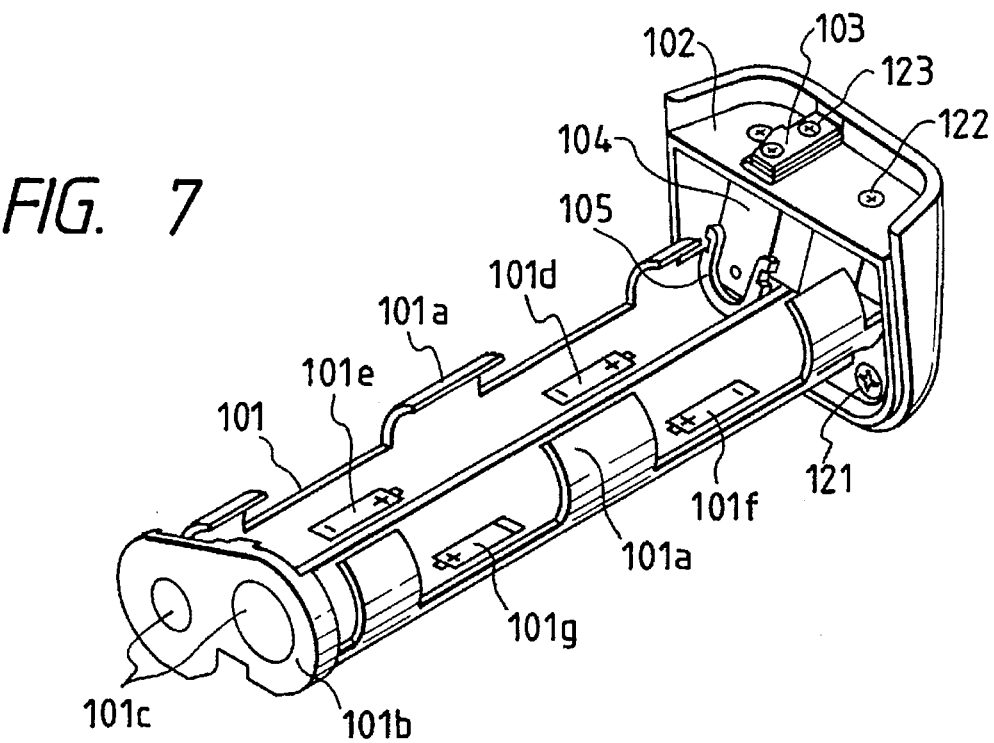
FIG. 7 is a perspective view showing a battery holder according to the second embodiment of the present invention.

FIG. 7 is a perspective view of a battery holder, which is loaded into a battery holder chamber of an accessory for supplying a power supply voltage to a camera main body, according to the second embodiment of the present invention. This battery holder parallelly stores two sets of two AA-type batteries each, and is formed by a holder main body 101, a battery lid 102, a lock pawl 103, battery contact springs 104, and a U-shaped insulating member 105 consisting of a plastic material. Blades 101a and a side wall 101b for fixing the batteries are formed on the holder main body 101. The side wall 101b has two opening portions 101c through which the contact pieces of the battery holder chamber (not shown) contact the batteries. Marks 101d to 101g indicating the polarities of the batteries are formed as embossed characters. The holder main body 101 and the battery lid 102 are fixed and integrated with each other by screws 121 and 122. The lock pawl 103 is attached to the battery lid 102 by screws 123. The battery contact springs 104 are attached to the battery lid 102 by screws (not shown).

Figure 8:
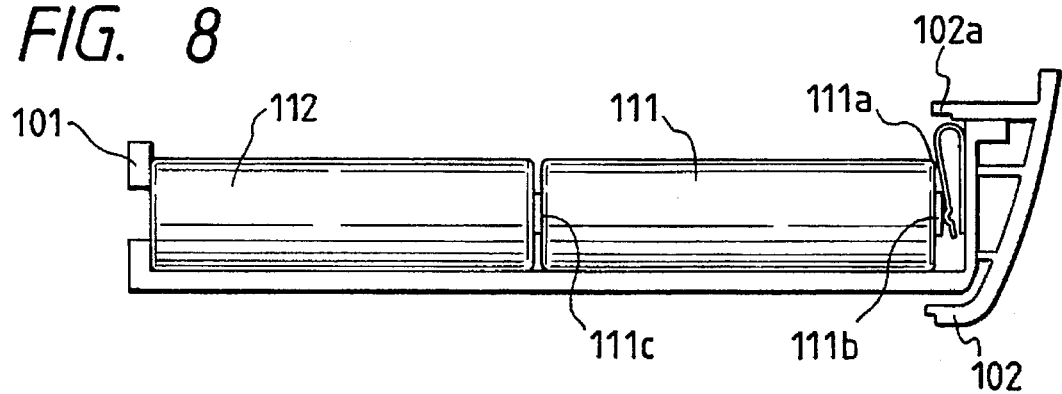
FIG. 8 is a longitudinal sectional view showing a state wherein a battery is inserted in the battery holder shown in FIG. 7.

FIG. 8 is a sectional view taken along a line passing the marks 101d and 101e in FIG. 7, i.e., a longitudinal sectional view showing a state wherein batteries are inserted in the holder main body 101. Assume that a battery corresponding to the mark 101d is denoted by 111, and a battery corresponding to the mark 101e is denoted by 112. In the normal insertion of batteries, the battery 111 is inserted in the holder main body 101, and thereafter, the battery 112 is inserted. If the battery 112 is inserted first, the battery 111 is inserted from its plus end 111b side pushing the battery contact spring 104, and thereafter, its minus end 111c side is inserted.

Figure 9:
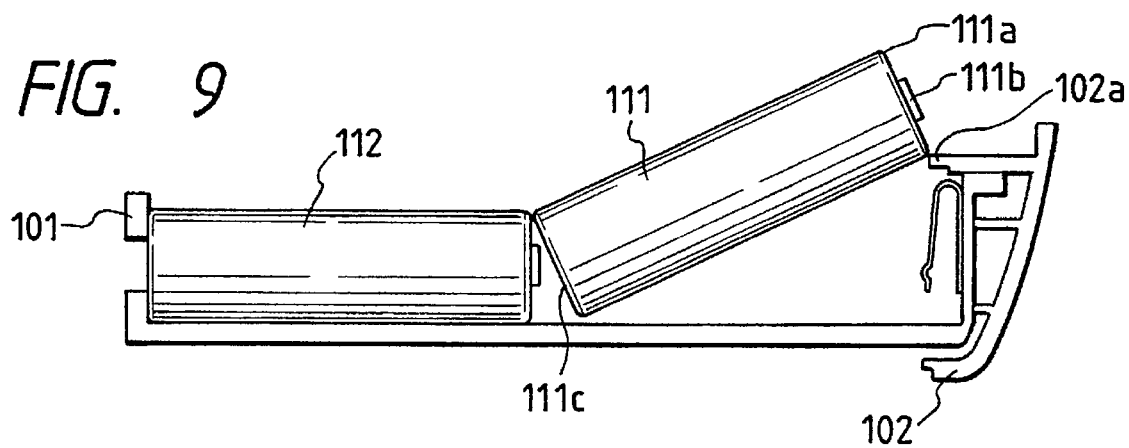
FIG. 9 is a sectional view showing a state wherein a battery which is about to be inserted with inverse polarity in the battery holder shown in FIG. 7 is blocked by an eave.

FIG. 9 is the same sectional view as in FIG. 8, and shows a state wherein a battery to be inserted is blocked by an eave (a protection member for preventing the battery contact spring from being deformed).

When the battery 111 is inserted after the battery 112 is inserted in the holder main body 101, if the battery 111 is inserted from the minus end 111c side first, and then, its plus end 111b is inserted, a corner portion 111a, on the plus end 111b side, of the battery 111 contacts an eave 102a of the battery lid 102, and cannot be inserted any more.

In this embodiment, the eave is formed at the plus end side of the battery. However, the present invention is not limited to this. For example, if a battery contact spring, which easily deforms, is disposed at the minus end side of a battery, the eave may be formed on this portion.

In this battery holder, since the protection member for preventing the battery contact spring from being deformed is arranged, a user cannot insert a battery in a way which deforms an elastic portion of the battery contact spring, and a trouble can be prevented.

The third embodiment of the present invention will be described in detail below.

Figure 10:
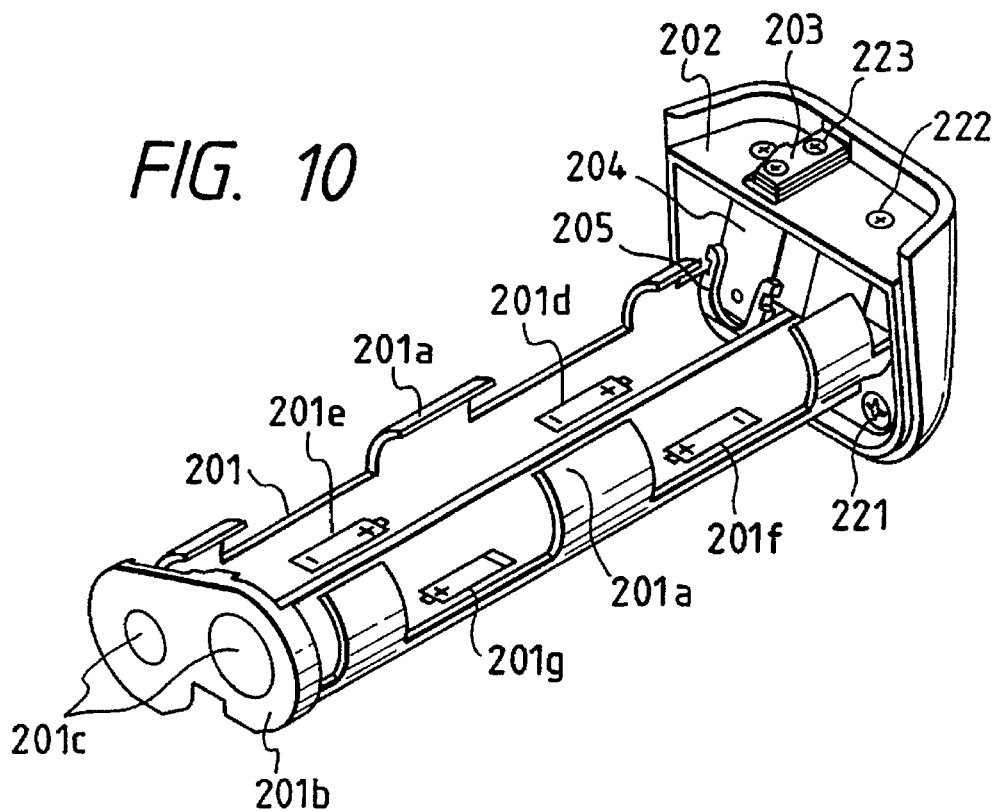
FIG. 10 is a perspective view showing a battery holder according to the third embodiment of the present invention.

FIG. 10 is a perspective view of a battery holder to be inserted in a battery holder chamber of an accessory for supplying a power supply voltage to a camera main body according to the third embodiment of the present invention. The battery holder parallelly stores two sets of two AA-type batteries each, and is formed by a holder main body 201, a battery lid 202, a lock pawl 203, a battery contact piece 204, and a U-shaped insulating member 205 consisting of a plastic material. Blades 201a and a side wall 201b for fixing the AA-type batteries are formed on the holder main body 201. The side wall 201b has two opening portions 201c through which the contact pieces of the battery holder chamber (not shown) contact the batteries. Marks 201d to 201g indicating the polarities of the batteries are formed as embossed characters. The holder main body 201 and the battery lid 202 are fixed and integrated with each other by screws 221 and 222. The lock pawl 203 is attached to the battery lid 202 by screws 223. The battery contact piece 204 are attached to the battery lid 202 by screws (not shown).

Figure 11:
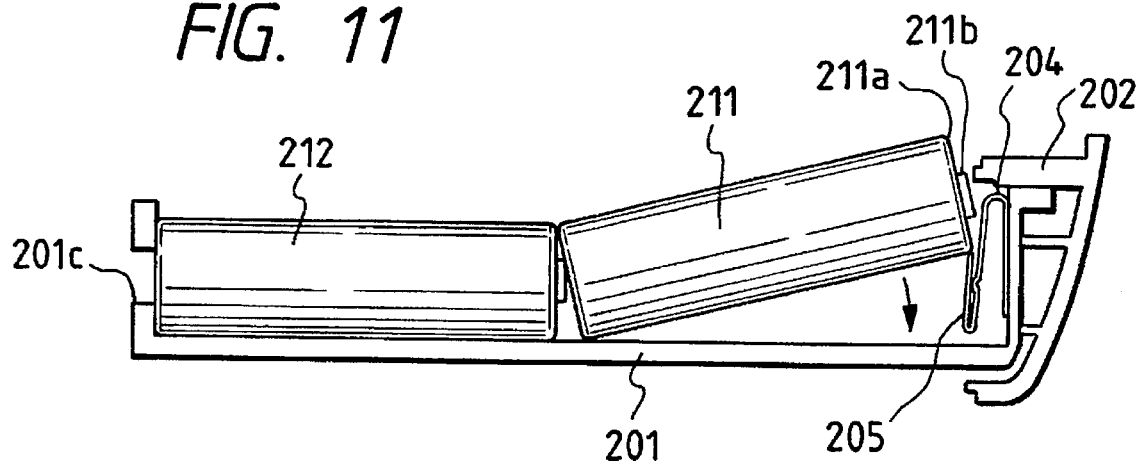
FIG. 11 is a longitudinal sectional view showing a state wherein a battery is about to be inserted into the battery holder shown in FIG. 10.
Figure 12:
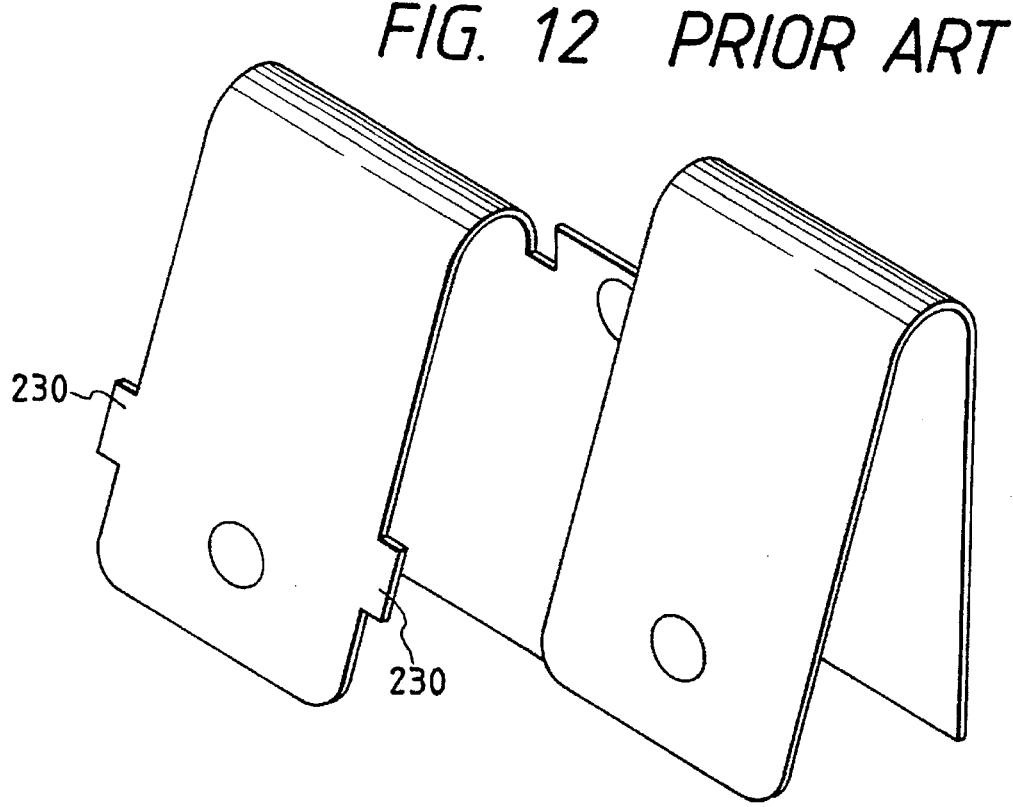
FIG. 12 is a perspective view showing projections of a conventional battery contact piece member.

FIG. 11 is a sectional view taken along a line passing the central positions of the marks 201d and 201e in FIG. 10. Assume that a battery corresponding to the mark 201d is denoted by 211, and a battery corresponding to the mark 201e is denoted by 212. When the battery 212 is inserted first, and thereafter, the battery 211 is inserted, as indicated by an arrow in FIG. 11, a corner portion 211a at the plus end of the battery 211 contacts the insulating member 205, and forcibly widens the insulating member 205.

Figure 13:
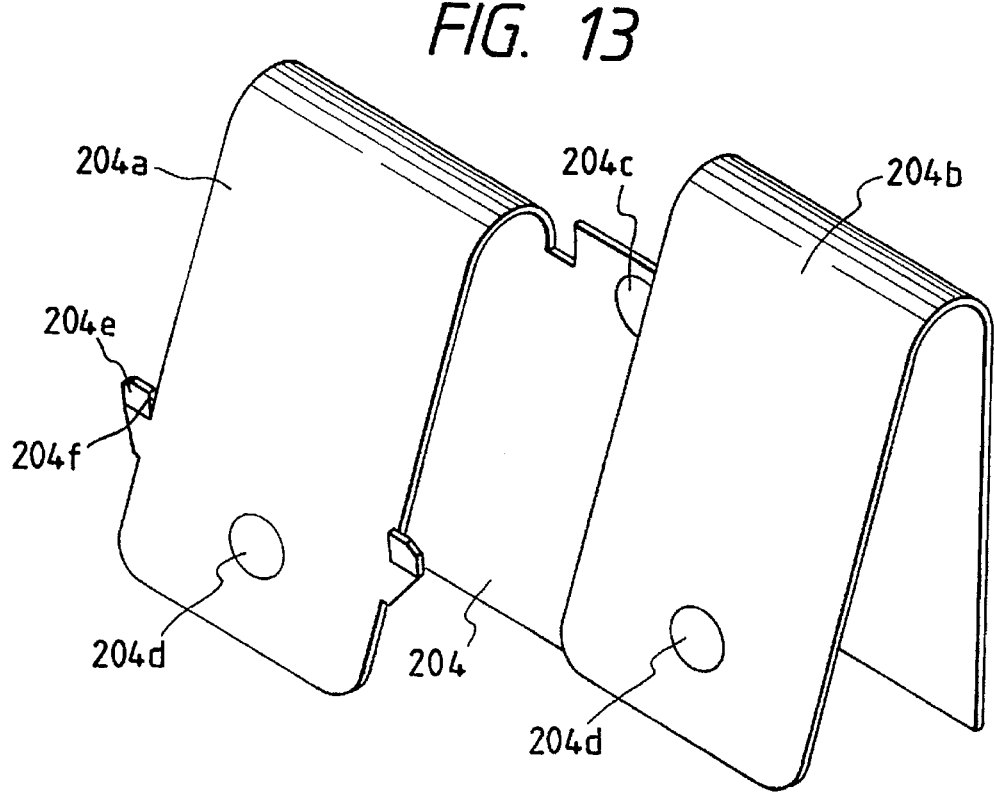
FIG. 13 is a perspective view showing bent portions of a battery contact piece member according to the third embodiment.

FIG. 13 is a perspective view showing the battery contact piece provided with bent portions according to the present invention. In this embodiment, the battery contact piece 204 is formed of a metal member having an elasticity and conductivity. The battery contact piece 204 is constituted by a plus-end side battery contact piece 204a and a minus-end side battery contact piece 204b. These battery contact pieces have projections 204d, which contact the batteries. The battery contact piece 204 has a hole portion 204c at its center, which portion is used for attaching the battery contact piece to the battery lid 202. Bent portions 204e and edges 204f of the bent portions are formed on the both sides of the plus-end side battery contact piece 204a. The bent portions 204e are formed by partially bending tab portions extending from the two edges of the contact piece 204a.

Figure 14:
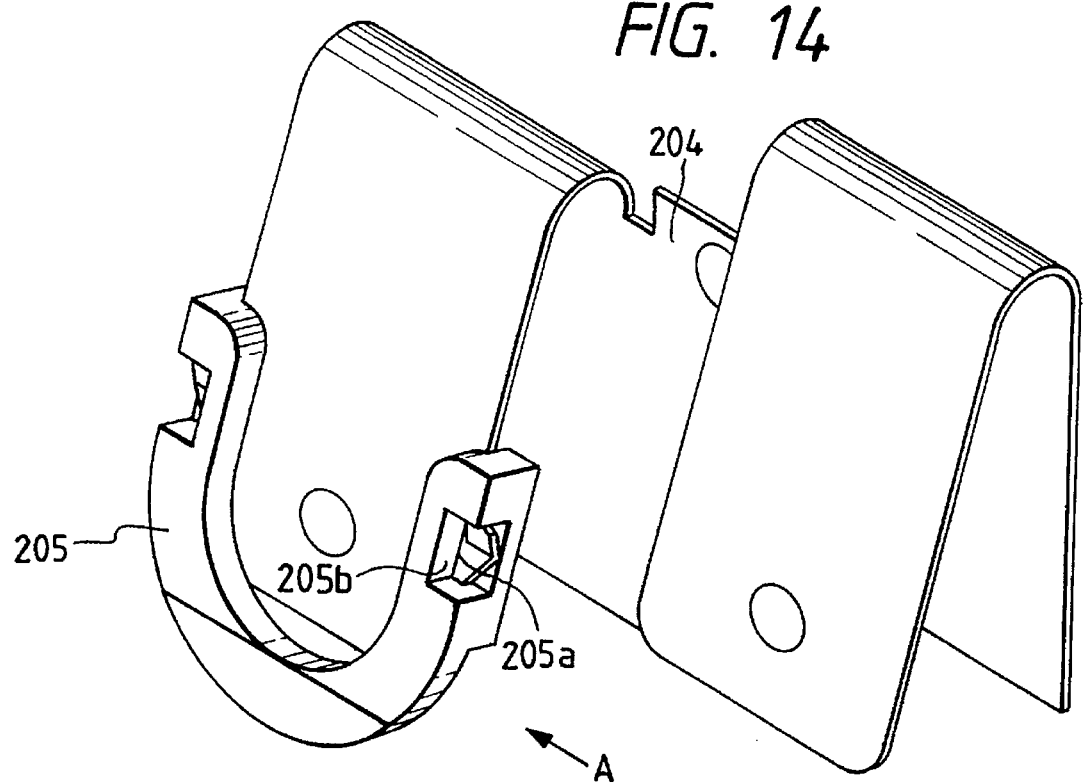
FIG. 14 is a perspective view showing a state wherein a reverse voltage prevention insulating member is attached to the battery contact piece member of the third embodiment.

FIG. 14 is a perspective view showing a state wherein the insulating member 205 for preventing a reverse voltage is fitted on the battery contact piece shown in FIG. 13. Opening portions 205a and edges 205b are formed on the two edges of the insulating member 205. Therefore, the edges 204f of the bent portions contact the edges 205b of the opening portion 205a. When the battery 211 is correctly inserted, a projection 211b on the plus end is at a higher level than the step between the insulating member 205 and the projection 204d of the battery contact piece 204, and the outer diameter of the projection 211b is smaller than the inner width of the insulating member 205. For this reason, the projection 211b is electrically connected to the battery contact piece 204a. On the other hand, when the battery is inserted with inverse polarity, since the outer diameter of the battery is larger than the inner width of the insulating member 205, the minus end of the battery is blocked by the insulating member 205 and cannot be electrically connected to the battery contact piece 204a.

Figure 15:
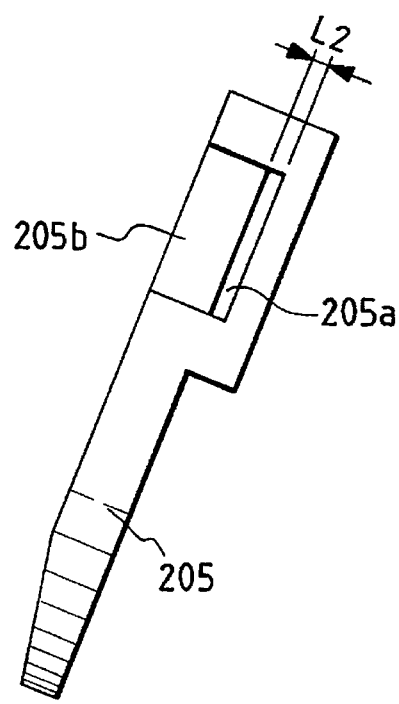
FIG. 15 is a partial explanatory view of the insulating member when viewed from a direction A in FIG. 14.

FIG. 15 is a side view of the insulating member 205 when viewed from a direction A in the perspective view of FIG. 14. The width of the opening portion is L2 which is slightly larger than the thickness, t, of the battery contact piece 204.

Figure 16:
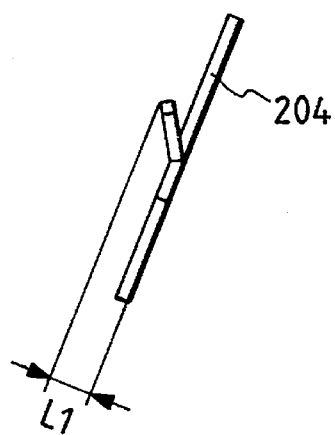
FIG. 16 is a partial explanatory view of the battery contact piece member when viewed from the direction A in FIG. 14.

FIG. 16 is a side view of the battery contact piece 204 when viewed from the direction A in the perspective view of FIG. 14. The height of the bent portion of the battery contact piece is L1. Therefore, since L1>L2, even when the insulating member 205 is pressed by the battery upon storage of the battery, and receives a force in a direction to disengage, the insulating member 205 can be prevented from disengaging from the battery contact piece 204.

As described above, according to the mechanism of the third embodiment of the present invention, bent portions are formed on the two edges of the battery contact piece, and are inserted in and engage with the opening portion formed on the insulating member. For this reason, even when a force acts in a direction to widen the insulating member, the insulating member can be prevented from disengaging independently of the way of insertion of the battery by a user since the edges of the bent portions of the battery contact piece engage those of the opening portions of the insulating member. The numbers of parts and assembling steps are the same as those in the conventional battery holder, and an increase in cost can be avoided.

What is claimed is:

1. A reverse voltage prevention mechanism for a battery, comprising:

a contact piece member which is arranged in a battery holder, contacts a plus end of a battery, and is formed with bent portions on two edges thereof; and an insulating member formed with opening portions for receiving the bent portions of said contact piece member.

2. A mechanism according to claim 1, wherein the bent portions of said contact piece member contact edges of the opening portions after they are inserted in the opening portions of said insulating member.

3. A mechanism according to claim 1, wherein said contact piece member has an elasticity, and a bending amount thereof is larger than a width of each of the opening portions of said insulating member.

4. A mechanism according to claim 1, wherein said insulating member has a U shape, a thickness smaller than a height of a projection on the plus end side of the battery, and an inner width of the U shape larger than a diameter of a projection on the plus end side of the battery, so that when the battery is inserted in a battery holder with correct polarity, said insulating member receives the projection on the plus end side of the battery inside the U shape to allow a contact between the projection and said contact piece member, and when the battery is inserted in the battery holder with inverse polarity, said insulating member prevents a minus end of the battery from contacting said contact piece member.

5. A mechanism according to claim 1, wherein said contact piece member has a substantially flat portion, which is to be in contact with an electrode of the battery, said flat portion is formed with tabs projecting from two edges thereof, and the bent portions are formed by partially bending the tabs.

6. A mechanism according to claim 5, wherein the flat portion is formed with a projection which is to be in contact with the electrode of the battery.

* * * * *